UNITED STATES PATENT OFFICE.

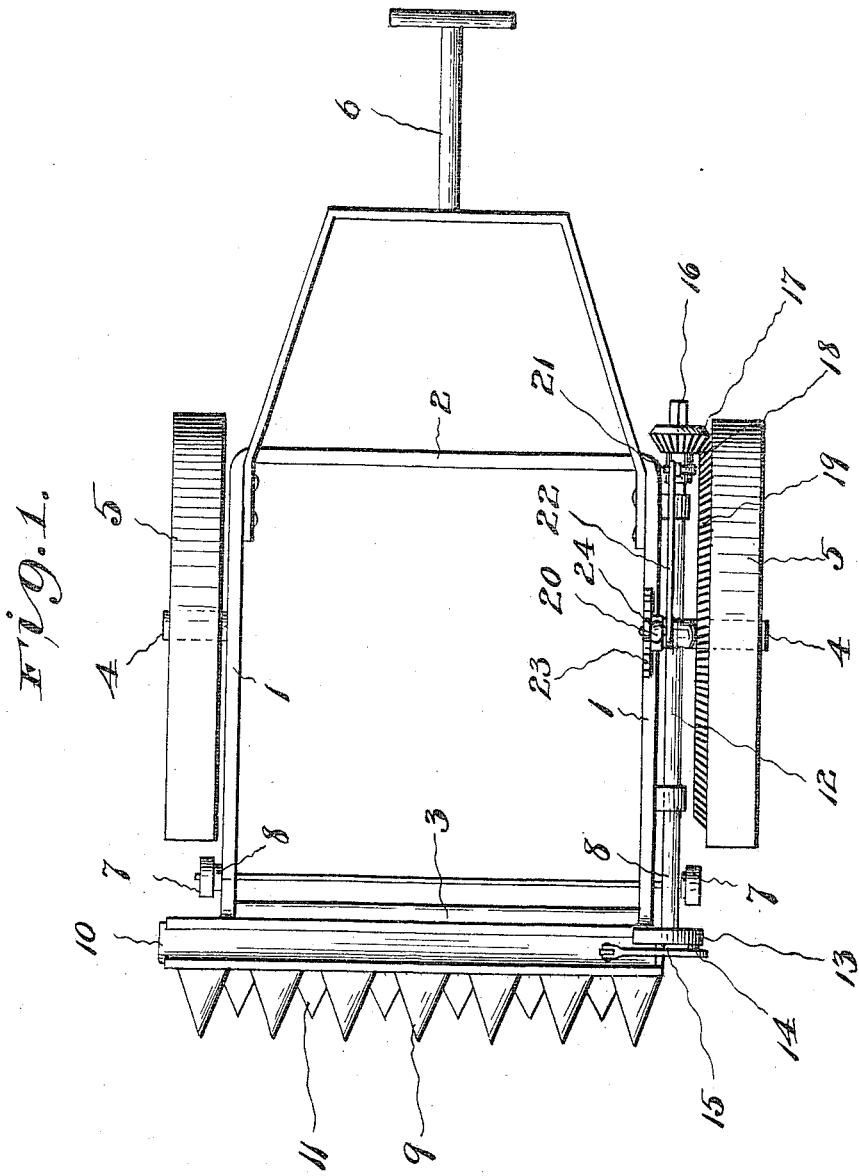

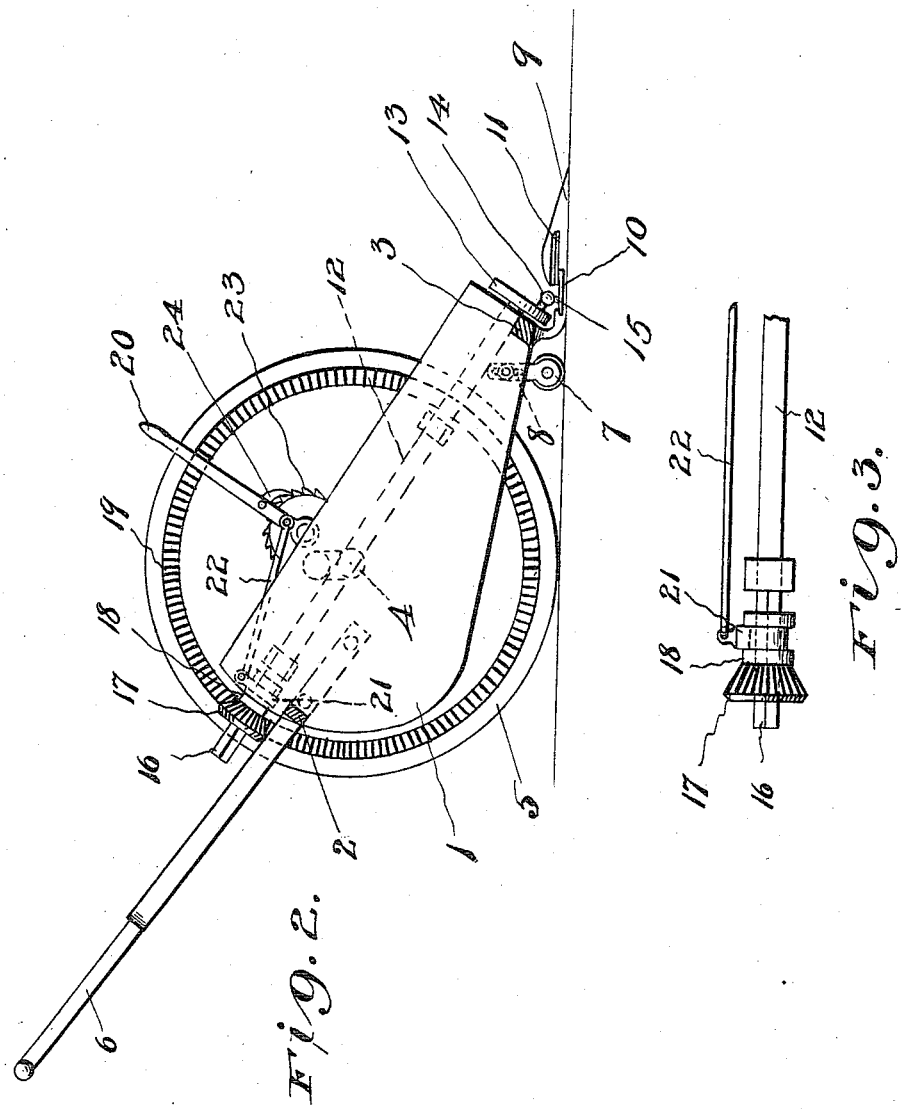

THEODORE CRAWLEY, OF GREENCASTLE, INDIANA.

LAWN-MOWER.

964,617.

Specification of Letters Patent. Patented July 19, 1910.

Application filed January 25, 1909. Serial No. 474,146.

*To all whom it may concern:*

Be it known that I, THEODORE CRAWLEY, a citizen of the United States, residing at Greencastle, in the county of Putnam and State of Indiana, have invented certain new and useful Improvements in Lawn-Mowers, of which the following is a specification.

My invention relates to lawn mowers of the reciprocating cutter bar type and has for its object the provision of a machine consisting of but a few parts combined in a novel manner and consequently reasonable in cost of manufacture and easily kept in repair.

My invention also consists in so constructing the driving mechanism that it can be thrown into and out of gear as desired by the operator, and in a novel means for controlling said gearing.

The construction and operation of my improved device will be described in detail hereinafter and illustrated in the accompanying drawings in which—

Figure 1 is a top plan view of my improved lawn mower, Fig. 2, a longitudinal sectional view, and Fig. 3, a detail view of the driving shaft.

In the drawings similar reference characters indicate corresponding parts in all of the views.

The frame of my improved lawn mower consists of the side plates 1 connected by means of cross-bars 2 and 3. The outer sides of side plates 1 have arbors 4 secured to or formed integral therewith on which are journaled wheels 5. 6 indicating the handle for operating the machine.

7 indicates rollers journaled on slotted plates 8 adjustably mounted on plates 1 to regulate the height of the front of the machine.

The finger bar 9 of the cutting apparatus is secured to cross-bar 3 at the front of plates 1 and has a reciprocating cutter-bar 10 slidably mounted thereon and provided with the usual cutting blades 11.

12 indicates a shaft journaled on one of the side plates 1 having a disk 13 secured to its front end and with crank pin 14 secured thereto.

15 indicates a link connecting cutter bar 10 and crank pin 14.

The rear end of shaft 12 is formed square in cross-section as shown at 16 and has a beveled pinion 17 slidably mounted thereon and provided with an annularly grooved collar 18.

19 indicates a beveled gear secured to the inner side of one of the wheels 5 that meshes with pinion 17 to rotate shaft 12 and reciprocate cutter bar 10.

20 indicates a lever fulcrumed on the top of plate 1 adjacent to shaft 12, 21 a sleeve engaging the grooved collar 18 and 22 a rod connecting lever 20 and sleeve 21 so that as the lever may be swung forward or backward the pinion 17 will be thrown into and out of engagement with the beveled gear 19.

23 indicates a segmental rack secured to the plate 1 and 24 a detent secured to the lever that engages rack 23 to hold the lever in adjusted positions.

It will be understood from this description and an inspection of the drawings that when the pinion 17 is in mesh with gear 19 the continual rotation of the wheel 5 is transformed into a reciprocating motion by the link 15 that is secured to crank pin 14 on disk 13 secured to the end of shaft 12, and the cutter bar 10 is given a reciprocating motion. When it is desired to stop the operation of the cutting apparatus the lever 20 is swung to the rear so as to move the pinion 17 away from the gear 19 and the shaft 12 does not rotate. The front of the machine as well as the cutting apparatus may be adjusted by means of the slotted plates 8 on which are journaled rollers 7.

Having thus described my invention what I claim is—

A lawn mower comprising the combination of a frame consisting of side plates, and cross-bars connecting said side plates, arbors projecting laterally from said plates, wheels journaled on said arbors, a reciprocating cutting apparatus secured to the front of the frame, a shaft journaled on one of said side plates, operative mechanism connecting said shaft and the reciprocating cutting apparatus, a beveled gear on one of the wheels aforesaid, a beveled pinion splined on the shaft and adapted to mesh with the beveled gear, a collar on the pinion having a circumferential groove therein, a sleeve mounted in said groove, a lever fulcrumed on the side plate adjacent to the shaft, a rod secured to the lever and the sleeve, a segmental rack secured to the plate, and a detent secured to the lever and adapted to engage the rack.

In testimony whereof I hereto affix my signature in the presence of two witnesses.

THEODORE CRAWLEY.

Witnesses:
GILBERT S. WOOD,
PHILIP M. FRANK.